United States Patent
Escarguel et al.

(10) Patent No.: US 10,152,469 B2
(45) Date of Patent: Dec. 11, 2018

(54) ANALYTICS REPORT SEGMENTS AND CONTROLS

(71) Applicant: Adobe Systems Incorporated, San Jose, CA (US)

(72) Inventors: Guillaume L. Escarguel, San Diego, CA (US); Frank E. Snedecor, III, Vista, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 638 days.

(21) Appl. No.: 14/247,733

(22) Filed: Apr. 8, 2014

(65) Prior Publication Data
US 2015/0286625 A1 Oct. 8, 2015

(51) Int. Cl.
*G06F 17/22* (2006.01)
*G06F 17/24* (2006.01)
*G06Q 30/02* (2012.01)
*G06F 17/30* (2006.01)

(52) U.S. Cl.
CPC ...... *G06F 17/246* (2013.01); *G06F 17/30112* (2013.01); *G06Q 30/0242* (2013.01)

(58) Field of Classification Search
CPC .............. G06Q 30/0242; G06F 17/246; G06F 17/30112
See application file for complete search history.

(56) References Cited

U.S. PATENT DOCUMENTS

| | | | | |
|---|---|---|---|---|
| 5,721,847 A * | 2/1998 | Johnson | ................ | G06F 3/0481 715/209 |
| 6,707,454 B1 * | 3/2004 | Barg | ..................... | G06F 17/246 345/440 |
| 7,047,501 B2 * | 5/2006 | Morcos | ................ | G06F 9/4443 715/779 |
| 7,177,851 B2 * | 2/2007 | Afeyan | .................... | G06F 17/50 706/13 |
| 7,424,668 B2 * | 9/2008 | DeSpain | ............... | G06F 17/246 715/212 |
| 7,475,062 B2 * | 1/2009 | de Souza | ............... | G06Q 10/10 |
| 8,205,149 B2 * | 6/2012 | Chan | ..................... | G06F 17/246 715/210 |
| 8,255,828 B2 * | 8/2012 | Harris | ................... | G06F 3/0481 715/711 |
| 8,358,308 B2 * | 1/2013 | Robertson | ......... | G06F 17/30716 345/440 |
| 8,428,997 B2 * | 4/2013 | Maga | ............... | G06Q 10/06375 700/36 |

(Continued)

Primary Examiner — Maikhanh Nguyen
(74) Attorney, Agent, or Firm — Wolfe-SBMC

(57) ABSTRACT

Analytics report segments and controls techniques are described in which an analytics module enables retrieval and manipulation of analytics data for a marketing service within a host application, such as a spreadsheet application. The analytics module provides an interactive dialog for insertion of form controls into documents designed as filters for analytics data embedded in the documents. In response to changes in values for the form controls, the analytics module is configured to query a marketing service and update the analytics data accordingly Additionally, the analytics module is be configured to facilitate creation of new segments from directly within the host application based upon a selection of analytics data contained in a corresponding document.

17 Claims, 7 Drawing Sheets

(56) References Cited

U.S. PATENT DOCUMENTS

| | | | |
|---|---|---|---|
| 8,839,144 B2 * | 9/2014 | Kraus | G06Q 10/063 |
| | | | 715/804 |
| 9,053,083 B2 * | 6/2015 | Waldman | G06F 17/246 |
| 9,141,671 B2 * | 9/2015 | Schmidt | G06F 17/30525 |
| 9,378,197 B1 * | 6/2016 | Ghanem | G06F 17/246 |
| 9,454,726 B1 * | 9/2016 | Yao | G06N 5/022 |
| 2003/0088458 A1 * | 5/2003 | Afeyan | G06F 17/50 |
| | | | 706/13 |
| 2006/0218156 A1 * | 9/2006 | Schechinger | G06F 17/30864 |
| 2006/0282432 A1 * | 12/2006 | Cassidy | G06Q 30/02 |
| 2006/0288267 A1 * | 12/2006 | Despain | G06F 17/246 |
| | | | 715/212 |
| 2007/0203935 A1 * | 8/2007 | de Souza | G06Q 10/10 |
| 2009/0210814 A1 * | 8/2009 | Agrusa | G05B 23/0267 |
| | | | 715/772 |
| 2009/0322756 A1 * | 12/2009 | Robertson | G06F 17/30716 |
| | | | 345/440 |
| 2010/0100562 A1 * | 4/2010 | Millsap | G06T 11/206 |
| | | | 707/770 |
| 2010/0293073 A1 * | 11/2010 | Schmidt | G06F 17/30525 |
| | | | 705/26.62 |
| 2010/0293234 A1 * | 11/2010 | Schmidt | G06Q 30/0603 |
| | | | 709/206 |
| 2012/0109957 A1 * | 5/2012 | Vandervort | G06F 17/227 |
| | | | 707/737 |
| 2012/0174013 A1 * | 7/2012 | Kraus | G06Q 10/063 |
| | | | 715/771 |
| 2013/0144605 A1 * | 6/2013 | Brager | G06F 17/3061 |
| | | | 704/9 |
| 2014/0244349 A1 * | 8/2014 | King | G06Q 30/0201 |
| | | | 705/7.29 |

\* cited by examiner

ANALYTICS REPORT SEGMENTS AND CONTROLS

BACKGROUND

As consumer interaction with online resources (e.g., use of web resources, e-commerce, browsing activity, etc.) has grown, digital marketing and web analytics to make marketing decisions have also becoming increasingly more common. Generally, digital marketers seek to offer products, services, and content to consumers who will find the offers favorable and have a high probability of acting on the offers. Accordingly, one challenge faced by digital marketers is matching of offers to users so as to maximize the likelihood that users will accept the offers and accordingly optimize the return/reward to the digital marketers derived from the offers. Web analytics refers generally to tools that enable marketers to analyze consumer interaction and behaviors with web resources including for example creation of reports and interactive dashboards, real-time data manipulation and identification of issues, analysis of key performance indicators (KPIs), and assessment of opportunities.

Traditionally, web analytics platforms offer complex and/or proprietary workflows that may be difficult for unsophisticated users to utilize to produce custom reports and data views. Although, some platforms provide rudimentary support for access to analytics data through commercially available desktop applications (e.g., word processing and spreadsheet programs), the ability of analysts and marketers to manipulate data directly within such applications remains limited. Rather than being able to make modifications within familiar environments of desktop productivity applications, users are forced to make any changes to data views and dashboards directly through web analytics platforms, which may be time consuming and costly. Accordingly, analysis tools available through existing web analytics platforms may be insufficient for some users and data analysis scenarios.

SUMMARY

Analytics report segments and controls techniques are described herein. In one or more implementations, an analytics module is provided that enables retrieval and manipulation of analytics data collected by a marketing service from directly within a host application, such as a spreadsheet application. The analytics module may provide an interactive dialog that facilitates insertion of form controls (e.g., drop down lists or other user interface controls) directly into documents that are configured to enable selection(s) of filter parameters for filtering of analytics data embedded in the documents. The form controls are then automatically populated with selectable values for the filter parameters as indicated by the analytics data collected by the marketing service. For instance, form controls may be established in a document to filter a data set based on selections for one or more of a marketing segment, metrics supported by the system, or a date/time range. The analytics module is configured to query the marketing service and update the document accordingly in response to changes in values for the filter parameters selected via the form controls.

In addition, the analytics module may be configured to facilitate creation of new segments from directly within the host application based upon a selection of analytics data contained in a corresponding document. Different segments may generally be defined according to different combinations of segment parameters that correspond to interesting sub-sets of consumers and/or data such as for different locations, resources, groups of users, user traits, user behaviors, and combination thereof. The creation of new segments may involve ascertaining a selection of analytics data embedded within a document (e.g., spreadsheet data) and exposing an option to create a new segment in conjunction with the selected data. If the option is selected, segment parameters indicated by the selected analytics data are extracted and used to create the new segment through interaction with the marketing service. The new segment may then be made available along with other existing segments whenever a collection of segments is exposed in a user interface or otherwise employed by the analytics module.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Traditionally, web analytics platforms offer complex and/or proprietary workflows that may be difficult for unsophisticated users to utilize to produce custom reports and data views. Although, some platforms may provide rudimentary support for access to analytics data through commercially available desktop productivity applications (e.g., word processing and spreadsheet programs), the ability of analysts and marketers to manipulate data directly within such applications remains limited.

Analytics report segments and controls techniques are described herein. In one or more implementations, an analytics module is provided that enables retrieval and manipulation of analytics data collected by a marketing service from directly within a host application, such as a spreadsheet application. The analytics module may provide an interactive dialog that facilitates insertion of form controls (e.g., drop down lists or other user interface controls) directly into documents that are configured to enable selection(s) of filter parameters for filtering of analytics data embedded in the documents. The form controls are then automatically populated with selectable values for the filter parameters as indicated by the analytics data collected by the marketing service. For instance, form controls may be established in a document to filter a data set based on selections for one or more of a marketing segment, metrics supported by the system, or a date/time range. The analytics module is configured to query the marketing service and update the document accordingly in response to changes in values for the filter parameters selected via the form controls.

In addition, the analytics module may be configured to facilitate creation of new segments from directly within the host application based upon a selection of analytics data contained in a corresponding document. This may involve ascertaining a selection of analytics data embedded within a document (e.g., spreadsheet data) and exposing an option to create a new segment in conjunction with the selected data. If the option is selected, segment parameters indicated by the selected analytics data are extracted and used to create the new segment through interaction with the marketing service. The new segment may then be made available along with other existing segments whenever a collection of segments is exposed in a user interface or otherwise employed by the analytics module.

In the following discussion, an example environment is first described that may implement the techniques described herein. Example details regarding the techniques are then discussed in relation to some example scenarios, diagrams, and procedures. Lastly, an example system and components of the system are discussed that may be employed to implement various techniques described herein.

Example Environment

Figure 1:
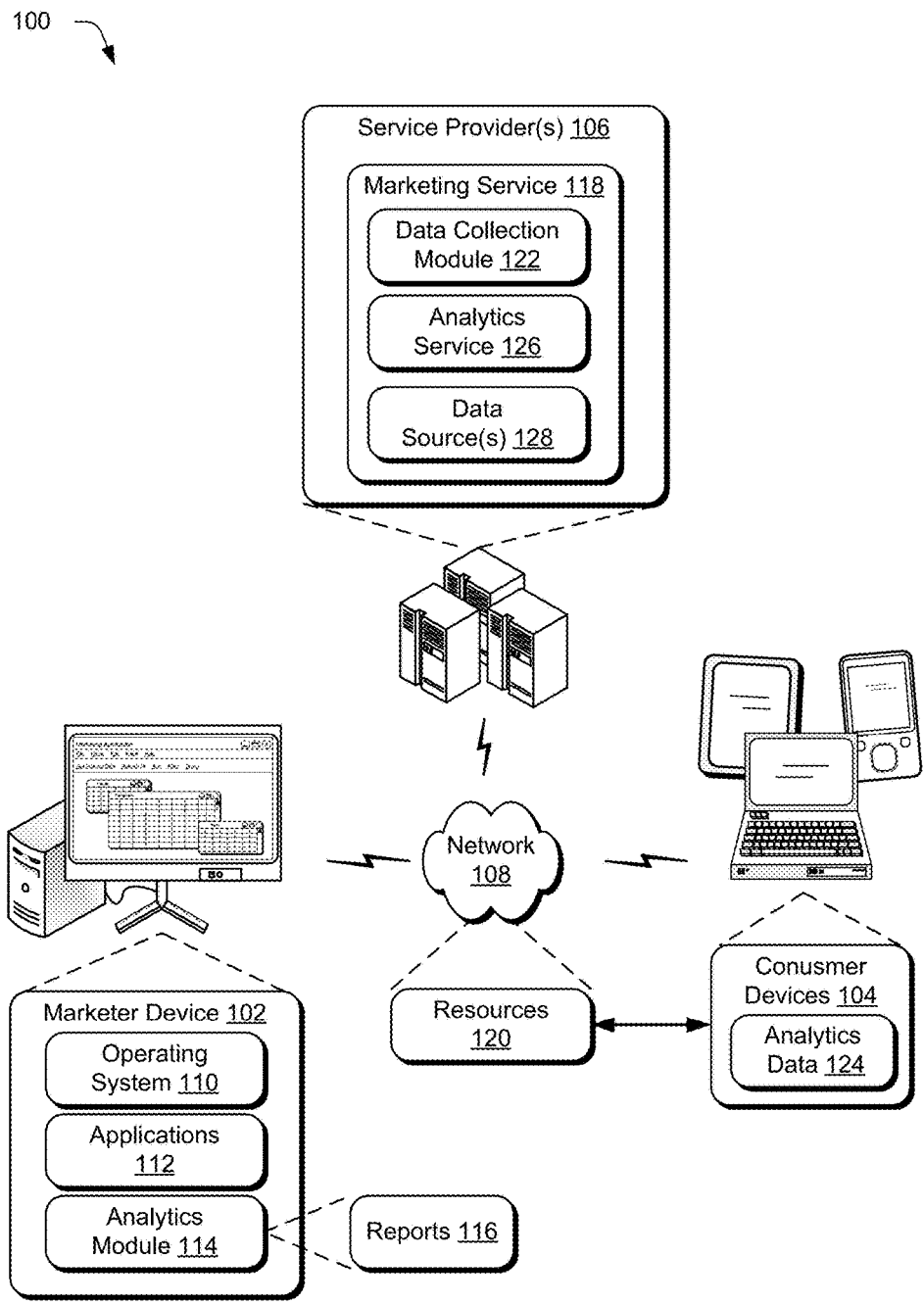
FIG. 1 is an illustration of an example operating environment that is operable to employ techniques for analytics segments and controls.

FIG. 1 is an illustration of an environment 100 in an example implementation that is operable to employ techniques described herein. The illustrated environment 100 includes a marketer device 102, one or more consumer devices 104, and a service provider 106 that are communicatively coupled via a network 108. The marketer device 102, consumer devices 104, and service provider 106 may each be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on.

Further examples of computing systems and devices suitable to implement techniques described herein are described below in relation to FIG. 7.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The marketer device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with devices are contemplated including, but not limited to, a document reader, a multi-media player, image editing software, a productivity suite that integrates multiple office productivity modules, games, and so forth.

The marketer device 102 is also illustrated as including an analytics module 114. The analytics module 114 may be configured in various ways to implement client-side aspects of techniques described herein. As illustrated, the analytics module 114 may be provided as a standalone application that may enable digital marketers to manage marketing campaigns, audience data, market segments, and so forth. In general, this includes collection of data indicative of users interaction with online resources, generation of reports 116 and dashboard views of the collected data, analysis of the data to ascertain market segments of consumers having selected traits, creation of offers for products, services, and/or content, and distribution of the offers to name a few examples. The analytics module 114 may facilitate interaction with a marketing service 118 provided by the service provider 106 over the network. Thus, the analytics module 114 may represent a thin client web-based application or a web-enabled desktop application through which a digital marketer may access a marketing account with the marketing service 118 and interact with corresponding data. In addition or alternatively, the analytics module 114 may be implemented as a plug-in for another desktop application program such as a browser, a spreadsheet application, a word processor, or other application 112.

As noted, a service provider 106 may provide a marketing service 118 as depicted in FIG. 1. The marketing service 118 is representative of an integrated digital marketing platform configured to provide a suite of digital marketing tools including but not limited to consumer data collection and analytics, social media management, digital advertising, audience targeting, and/or web experience management, to name a few examples. Various digital marketing tools may be made accessible via webpages or other user interfaces that may be accessed and rendered by a marketing device 102. In one approach, the analytics module 114 is configured to establish a data connection with the marketing service 118 through which various data may be accessed, viewed, and manipulated. The marketing service 118 may be implemented in the "cloud" as a service accessible over the network as illustrated, by one or more distributed components in a client-server environment, as a locally deployed enterprise platform, and/or in another suitable manner.

The marketing service 118 may provide monitoring, data collection, and analysis of collected data in connection with a multitude of resources that are available to consumers and consumer devices 104 over the network 108. The resources 118 can include any suitable combination of services and/or content typically made available over a network by one or more providers including resources associated with one or more service providers 106 and/or marketers. Some examples of services include, but are not limited to, the marketing service 118, a photo editing service, a web development and management service, a collaboration service, a social networking service, a messaging service, an advertisement service, and so forth. Content may include various combinations of text, video, ads, audio, multi-media streams, animations, images, web documents, web pages, web sites, applications, device applications, and the like.

In accordance with techniques described above and below, the marketing service 118 may include or otherwise make use of a data collection module 122 that is configured to obtain analytics data 124 from the consumer devices 104. In particular, the data collection module 122 represents functionality operable to collect, access, and/or make use of analytics data 124 that is indicative of online consumer interaction with offers, such as page views, site visits, unique visitors, user characteristics, and so forth. Generally, analytics data 124 may include user characteristics (e.g., age, sex, location, affiliations, traits, etc.) and behaviors (e.g., browsing habits, favorites, purchase history, preferences, account activity, page views, offer views, etc.) from the various consumers. The data collection module 122 may collect and store analytics data 124 on behalf of digital marketers. For example, analytics data 124 may be collected based on visitors to a company website, in response to ads placed on third party webpages, through online surveys, as part of e-commerce transactions, based on account sign-ups, and so forth.

In addition to collection of marketing data, the marketing service 118 may include an analytics module 126 that represent functionality operable by digital marketers to access and utilize analytics data in various ways to inform digital marketers regarding user activities and facilitate creation of effective marketing strategies and campaigns. For example, the analytics module 126 may be configured to form and maintain data sources 128 (e.g., databases) in association with accounts established for digital marketers. Accordingly, a particular digital marketer may be provided account-based access to their own data sources 128 and corresponding analytics data 124 collected for corresponding resources 120. In one or more implementations, the analytics module 126 is designed to facilities creation of reports 116 and dashboard views natively within the environment of the marketing service 118. In addition or alternatively, the analytics module 126 may provide functionality for data analysis and report creation using third-party software, such as commercially available spreadsheet programs or word processing programs. By so doing, the analytics service 126 enables users to access and manipulate analytics data 124 using familiar software productivity packages and data analysis tools.

Figure 2:
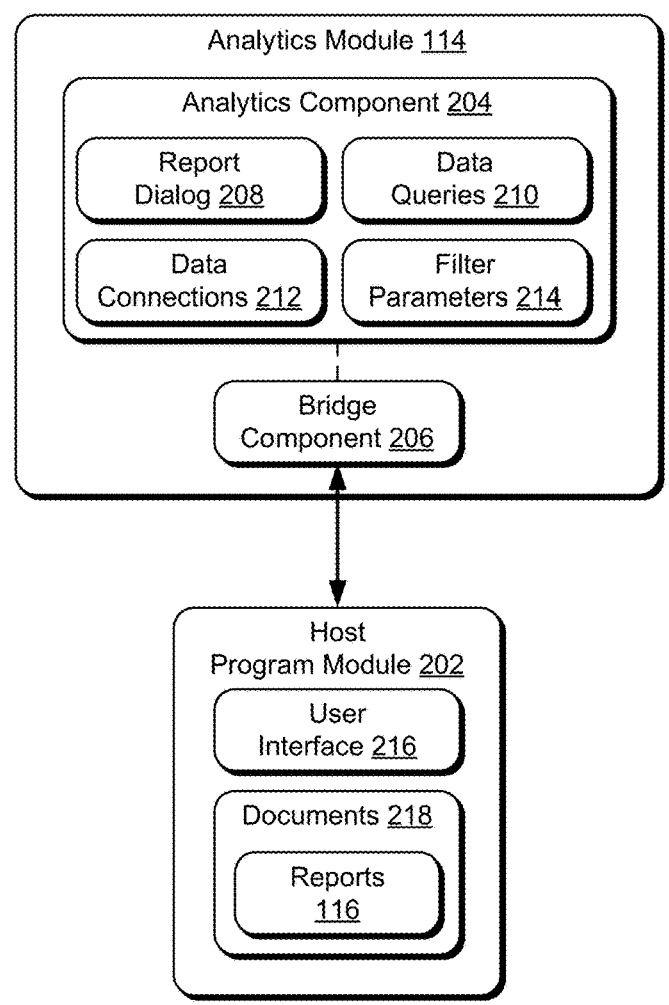
FIG. 2 is a diagram depicting details of an analytics module in accordance with one or more implementations.

To further illustrate, FIG. 2 depicts generally at 200 an example implementation of an analytics module configured as a plug-in for a host program module. In this approach, the "plug-in" analytics module 114 is designed as an interface between a host program module 202 and the marketing service 118 through which analytics data 124 from data sources 128 may be accessed, selected, and download into documents of the host program module 202. In implementation, the analytics module 114 may be configured as a COM add-in associated with the host program module 202 The analytics module 114 enables access to the marketing service 118 directly from within the user experience (UX) provided by the host program module 202. Moreover, the analytics module 114 may be utilized to invoke functionality provided by the host program module 202 to view the data, create reports and dashboard views, manipulate the data using native, built-in tools of the host, and so forth. Although, a variety of host program modules are contemplated in different implementations, in one particular example the host program module may be configured as a spreadsheet application that provides functionality for organization and analysis of data in a tabular form, such as Microsoft Excel™. The spreadsheet application may provide worksheets having a plurality of distinct cells and features for manipulation of the data such as functions, reference conventions, macros, chart and graph features, equations, formatting tools, and so forth.

In particular, the analytics module 114 is illustrated in FIG. 2 as having an analytics component 204 and a bridge component 206. The analytics component 204 represents functionality for accessing data sources 128 maintain by the marketing service 118 to select and download analytics data for manipulation via the host program module 202. This may include, but is not limited to, functionality operable to facilitate analytics report creation through a report dialog 208, establish data connections 212 to the marketing service 118, produce data queries 210 including selections of filter parameters 214 (e.g., marketing segments, KPIs and other metrics, and/or date and time constraints) to constrain the queries, execute queries for analytics data 124 from the marketing service, and download data to a spreadsheet or other document.

In accordance with techniques described herein, the analytics module 114 may additionally provide an interactive dialog that facilitates insertion of form controls (e.g., drop down lists or other user interface controls) directly into documents of the host. Form controls that are inserted into documents enable selection(s) of filter parameters for filtering of analytics data contained in the documents. The form controls are automatically populated with selectable values for the filter parameters as indicated by the analytics data 124 collected by the marketing service. For example, a marketing segment filter may be generated and populated with a list of available marketing segments corresponding to a data source 128 to which a document is connected. Selection of a segment via the marketing segment filter may cause underlying data for a document to change accordingly. In addition, the analytics module may be configured to facilitate creation of new segments from directly within the host program module 202 based upon a selection of analytics data contained in a corresponding document.

The bridge component 206 is configured to provide a communication interface between the analytics component 204 and host program module 202. For example, the bridge component 206 may operate to send commands from the analytics component 204 to direct the host program module 202. In addition, the bridge component 206 may obtain events, objects, data, and notices from the host program module 202 that may inform data queries 210 and trigger actions by the analytics component 204 to refresh analytics data. By way of example, the bridge component may be configured to provide and expose user-defined functions that may be called from the host program module 202. The user-defined functions of the bridge component 206 may be referenced directly from formulas or script of a document, as well as being linked to update events, such as on action events associated with form controls. A user defined function linked to a form control is called from the host program module when a change in the value of the form control occurs. The bridge component 206 handles the functions calls and may invoke the analytics component 204 in response to process the calls and refresh corresponding analytics data in the document as appropriate. For instance, filter parameter values for form controls and other metadata (cell or control identifier) included in calls to user-defined functions may be passed into the analytics component 204 for processing to update corresponding data sets in the document, As represented in FIG. 2, the host program module 202 may provide a user interface 216 through which analytics data 124 may be presented. Functionality of both the host program module 202 and the analytics module 114 may be accessible via various menus, tool bars, icons and selectable controls provided by the host program module 202. Documents 218 associated with the host program module 202 may be created via the analytics module 114 to include reports 116 designed to include analytics data 124. The analytics data 124 is obtained from the marketing service 118 and embedded directly within the documents 218. Functionality of the host program module 202 may then be used to manipulate the data in various ways such as to format the data, apply formulas, apply view filters, create charts and graphs, and so forth. In this way, an analyst may create various dashboard views of analytics data as reports 116 in documents 218 of a host program. The analytics module 114 may be used to refresh the underlying data in the reports 116 or change the parameters so that the same report may be used again and again.

Having considered an example environment, consider now a discussion of some example details of techniques for analytics segments and controls in accordance with one or more implementations.

Analytics Report Segment and Control Details

The following discussion describes example procedures and user interfaces that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to examples of FIGS. 1-2. In at least some embodiments, the procedures may be performed by a suitably configured computing device(s), such as a marketer device 102 of FIG. 1 that includes a suitable analytics module 114 to implement the described techniques and/or one or more server devices associated with the service provider 106 that implement a marketing service 118.

Interactive Form Controls

In accordance with the foregoing discussion, collected analytics data 124 may be analyzed using an analytics module 114 that is configured as a component of or plug-in for a host application program 202, such as a spreadsheet application or other productivity product. The analytics module 114 may be configured to support insertion of interactive form controls directly into documents 218 of the host application program 202. Analytics data 124 retrieved from a service and included within a document may depend upon one or more interactive form controls such that the data may be filtered and updated in response to selection of filter parameters via the form controls. The interactive form controls may be automatically populated with values for the filters from a corresponding data source 128, such as a list of marketing segments, types of KPIs or analytic metrics (e.g., page hits, visits, unique visitors, visitor behaviors, etc.), time period selections (e.g., today, this week, month, etc.), and so forth.

Figure 3:
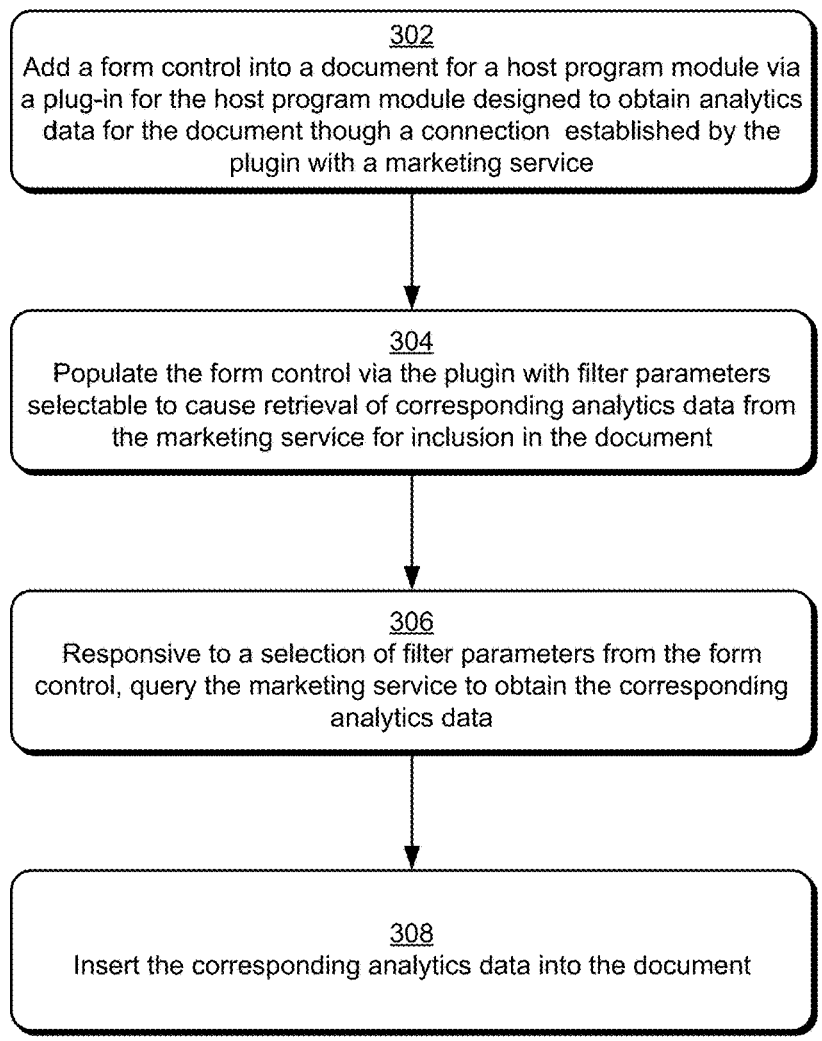
FIG. 3 is a flow diagram depicting an example procedure for insertion of a form control in accordance with one or more implementations.

To further illustrate details of the example techniques, consider now FIG. 3 which depicts generally at 300 an example procedure in which a form control is inserted into a document. A form control is added into a document for a host program module via a plug-in for the host program module designed to obtain analytics data for the document through a connection established by the plug-in with a marketing service (block 302). For example, an analytics module 114 may be launched within a UX for host program module 202 as previously mentioned. The analytics module 114 enables a marketer or analyst to interact with a marketing service 118 and in particular an analytics service 126 provided by the marketing service to access, manage, and manipulate analytics data 124 corresponding to various resources 120. In particular, analytics data describing interactions of consumers with one or more web resources made available by a service provider may be analyzed using features of the host program module. For example, the analytics module 114 associated with the host program may be employed to define data queries, configure documents as reports to interact with analytic data, download data into the reports, and so forth. Accordingly, a document of a host program may be configured as an analytics report that contains embedded analytics data obtained over a network from the marketing service using the analytics module 114.

The analytics module 114 may additionally provide functionality to configure form controls that may be used to selectively filter corresponding data and add the form controls into documents. For example, the analytics module 114 may be configured to enable insertion of one or more list boxes (or other controls) directly into cells of a spreadsheet that may be used to filter a block of analytics data that is downloaded into the spreadsheet. An interactive dialog may be exposed that facilitates selection of analytics data 124 through interaction with the analytics service 126. This dialog may also provide functionality to automatically configure and insert form controls within a document. In an implementation, the form controls are provided as built-in functionality of the host program module that is invoked via the analytics plug-in. The analytics module 114 is designed to simplify the process of adding form controls by providing the interactive dialog and handling the set-up of the controls based on selections obtained via the dialog.

The form control is populated via the plug-in with filter parameters selectable to cause retrieval of corresponding analytics data from the marketing service for inclusion in the document (block 304). For instance, form controls may operate as filters that may be used to select values for filter parameters as mentioned previously. Here, the analytics module 114 operates to populate form controls with appropriate values, such as a list of available market segments for a data source or pre-configured time period expressions. The form controls enable users to quickly change filter parameters by selection of the different values from directly within the document, which causes retrieval of corresponding analytics data from a data source. As noted, a variety of filtering form controls corresponding to different filter parameters may be established within a given report to facilitate different data views. By way of example and not limitation, form controls may be created and populated using a collection of marketing segments for filtering according to different defined segments, time period expressions for filtering of the analytics data according to selected time periods and/or a collection of analytics metrics for filtering of the analytics data based on performance indicators supported by the marketing service.

Then, responsive to a selection of filter parameters from the form control, the marketing service is queried to obtain the corresponding analytics data (block 306) and the corresponding analytics data is inserted into the document (block 308). For example, the analytics module 114 may be configured to detect when changes in the filter parameters occur via the form controls and update analytics data in a report accordingly. For instance, a user-defined function may be linked to changes in the filter parameters associated with a form control (e.g., on action properties) via a bridge component or otherwise. When the value of a filter parameter is changed via the form control, the user-defined function is called with the new value for the filter parameter, which passes the value to the analytics module 114 for handling. The analytics module 114 then determines data sets in a report/document that are linked to filter parameters that are changed. The analytics module 114 may update queries for any linked data sets with the new filter parameter values and refresh the data contained in the report/document through interaction with the marketing service 118.

Figure 4:
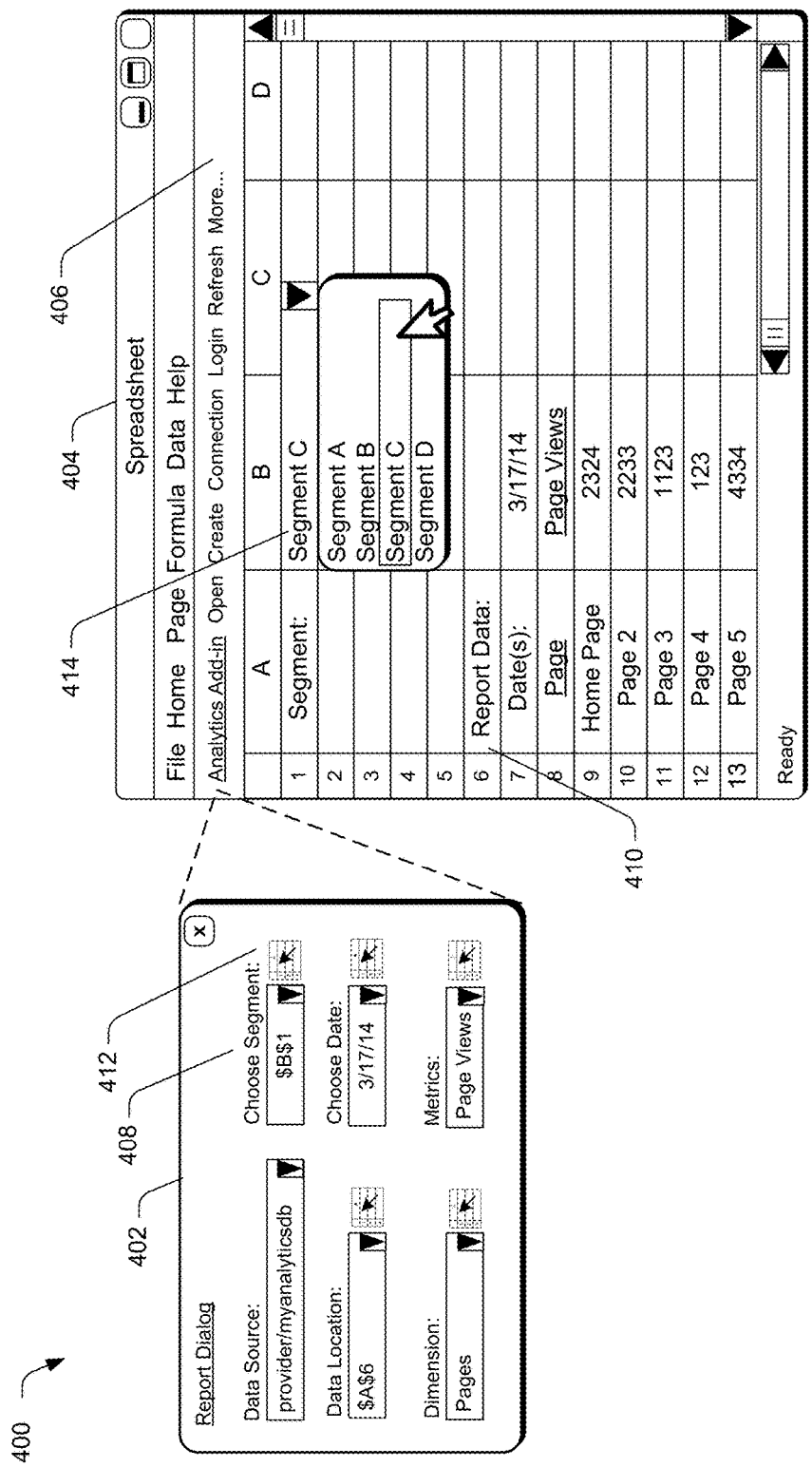
FIG. 4 is a diagram depicting example user interface scenario for interactive form controls in accordance with one or more implementations.

FIG. 4 depicts generally at 400 an example user interface scenario for interactive form controls in accordance with one or more implementations. The example of FIG. 4 depicts aspects of creating and using an interactive form control within a spreadsheet application, although other kinds of application may also be used for data analysis. In the depicted example, a report dialog 402 is shown that may be accessible via a spreadsheet user interface 404. For example, the spreadsheet user interface 404 is depicted as including an analytics plug-in menu 406 in form of a tool-bar that may be operable to access various analytics related functionality. The analytics plug-in menu 406 may correspond to an analytics module 114 as described herein. For instance, the analytics plug-in menu 406 enables a marketer or analyst to invoke functionality to access and manipulate analytics data 124 directly within the spreadsheet program (e.g., host program module 202).

A represented, the report dialog 402 is configured to enable selections to define a data query to generate the example report shown. In particular, selections for a data source, segment, data location for the retrieved data, a date or time period expression, report dimensions, and marketing metrics may be made via the report dialog 402. In order to facilitate such selections, the report dialog 402 includes controls 408 such as drop-down lists associated with each parameter. A user may input particular values for each parameter via corresponding controls 408. Once the report is configured, the analytics module 114 may establish a connection to the designated data source, query data according to the selected parameters, and return the data to the designated data location 410 in the spreadsheet as shown.

In accordance, with techniques described herein, the report dialog 402 may also provide an option 412 selectable to insert interactive form controls 414 for one or more of the selected parameters. The option 412 enables a user to specify a cell or cell range for a filter parameter instead of setting a fixed value. In the example of FIG. 4, a cell value of "$B$1" is shown as being associated with the segment field. An option 412 may be configured in any suitable way to facilitate the creation and insertion of a form control directly into a document. Here, the option 412 is represented as a range select control for the spreadsheet program that is operable to navigate to the spreadsheet and make a selection of one or more cells. Based on such a selection, a corresponding interactive form control 414 in the form of a drop-down list is shown as being added into the spreadsheet at the designated location. Naturally other types of form controls may also be employed such as a radio control, a pop-up selection box, or other user interface instrumentality.

The interactive form control 414 is also automatically populated with a collection of available market segments. The configuration and insertion of the interactive form control 414 occurs automatically based on the cell value selected via the option 412. A user therefore may create such form controls without having sophisticated knowledge regarding how to define the controls. Optionally, a user may additionally be provided an option through the dialog to refine a list of market segments (or other filter parameter) by making individual selections or de-selections of items to include in a populated collection. Now, a user may make a selection of the marketing segments via the interactive form control 414 from directly within the spreadsheet document. Creation of form controls for other filter parameters may occur in a comparable manner. Whenever the value in an interactive form control 414 changes, the analytics data 124 inserted at the designated data location 410 in the spreadsheet changes accordingly and may be automatically refreshed.

Segment Creation

As mentioned, different segments may generally be defined according to different combinations of segment parameters that correspond to interesting sub-sets of consumers and/or data such as for different locations, resources, groups of users, user traits, user behaviors, and combination thereof. In the course of performing analysis on existing data sets and segments, an analyst may in some cases recognize another sub-combination or set of parameters as being particularly interesting or having value. Accordingly, the analyst may want to create a new segment that is organized around the sub-combination or set of parameters that is identified. In a traditional model, the analyst may have to navigate away from the current analysis tool and launch a development interface of a marketing service to define a new segment. Moreover, the analyst may have to recall and manually input all the parameters associated with the segment they wanted to create, which can be tedious and error prone.

As mentioned, an analytics module 114 as described herein may be configured to facilitate creation of new segments from directly within a host program module 202. The creation of a new segment may be based upon a selection of analytics data contained in a corresponding document. Thus, in the foregoing scenario, the analyst may quickly and easily create a new segment as soon as the interesting combination of parameter is recognized and without leaving the analysis environment of the host program. The analytics module 114 is configured to handle communications with the marketing service to create the new segment and then make the segment available in the host environment, such as to define a different report or for inclusion as an item of an interactive form control as described above.

Figure 5:
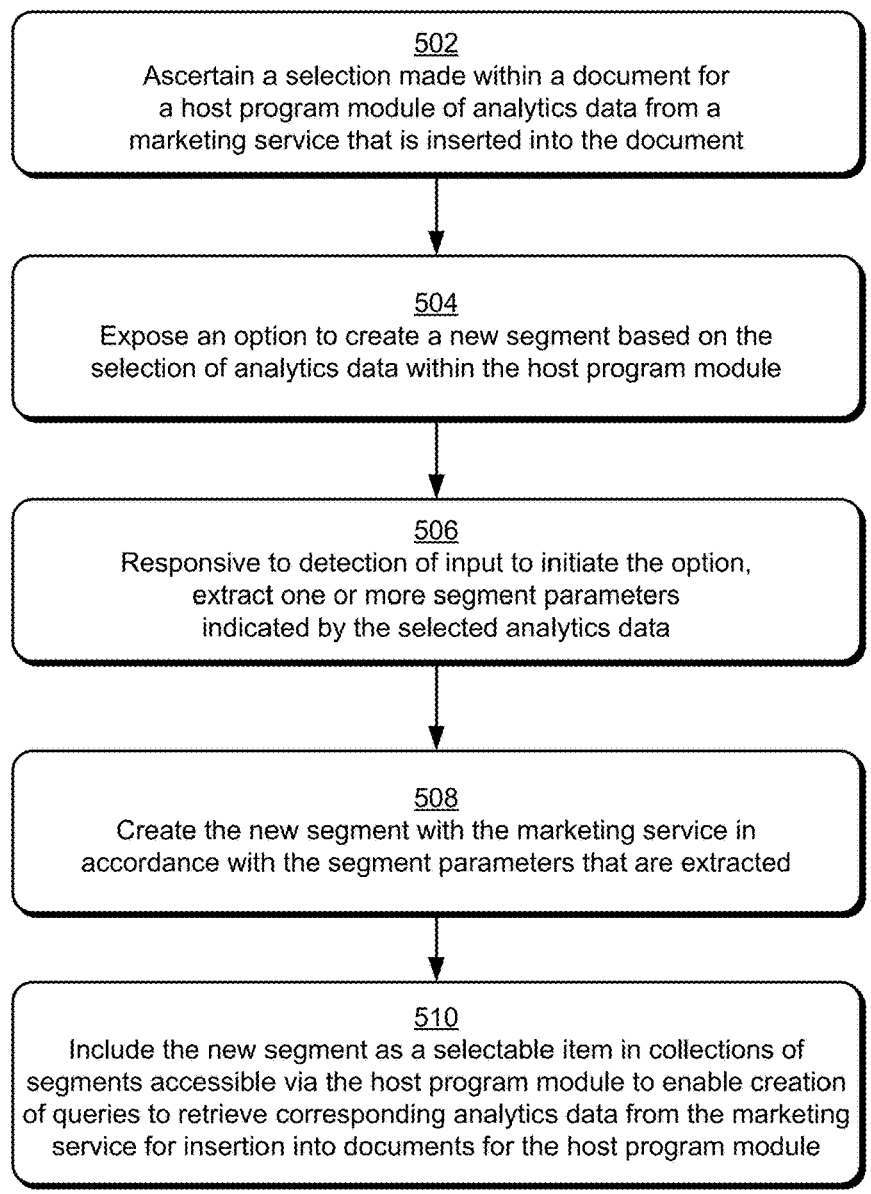
FIG. 5 is a flow diagram depicting an example procedure for creation of a segment in accordance with one or more implementations.

To further illustrate details of the example techniques, consider now FIG. 5 which depicts generally at 500 an example procedure in which a segment is created. A selection made within a document for a host program module is ascertained of analytics data from a marketing service that is inserted into the document (block 502). Then, an option is exposed to create a new segment based on the selection of analytics data within the host program module (block 504). In one approach, an analyst simply selects data of interest within a spreadsheet (or other document) and performs a right click to bring up an option to initiate creation of the new segment based on the selection. Naturally, other techniques may alternatively be employed to initiate creation of the new segment such as interaction via menu item selections and/or a creation dialog.

Responsive to detection of input to initiate the option, one or more segment parameters indicated by the selected analytics data are extracted (block 506). For example, the analytics module 114 may be invoked to create a corresponding segment when the option is selected. To do so, the analytics module 114 may parse the selected data and underlying queries to extract various metadata that contains segment parameters for the data. These segment parameters may specify particular metrics, locations, resources, groups of users, user traits, user behaviors, and combinations of these parameters that may be used to define and create the new segment.

The new segment is created with the marketing service in accordance with the segment parameters that are extracted (block 508). Here, the analytics module 114 may form a request to create the new segment that includes the extracted parameters and communicate the request to the marketing service 118. A dialog may also be exposed that enables a user to review the extracted segment parameters and refine the new segment, such as by adding additional parameters to the extracted segment parameters, deselecting some of the parameters, and so forth. The user may also provide a name for the new segment and make a selection to submit the request. Then, the marketing service 118 processes the request and creates the specified segment. In one approach, the creation process occurs without leaving the working environment of the host program. In addition or alternatively, the analytics module 114 may be designed to provide a workflow that automatically navigates back and forth between interfaces of the host program and the marketing service 118 to bring up appropriate dialogs for creation the new segment. The analytics module 114 may seamlessly transition between the host program and the service such that a user may not even notice that the marketing service 118 is being invoked.

The new segment is included as a selectable item in collections of segments accessible via the host program module to enable creation of queries to retrieve corresponding analytics data from the marketing service for insertion into documents for the host program module (block 510). In general, the new segment may be made available along with other existing segments whenever a collection of segments is exposed in a user interface or otherwise employed by the analytics module. For example, the segment that is created may be included as an item in a form control configured as a segment filter for analytics data contained in a document of a host program. The new segment may also be exposed as an option in a report dialog and be made accessible throughout various tools available from the marketing service 118.

Figure 6:
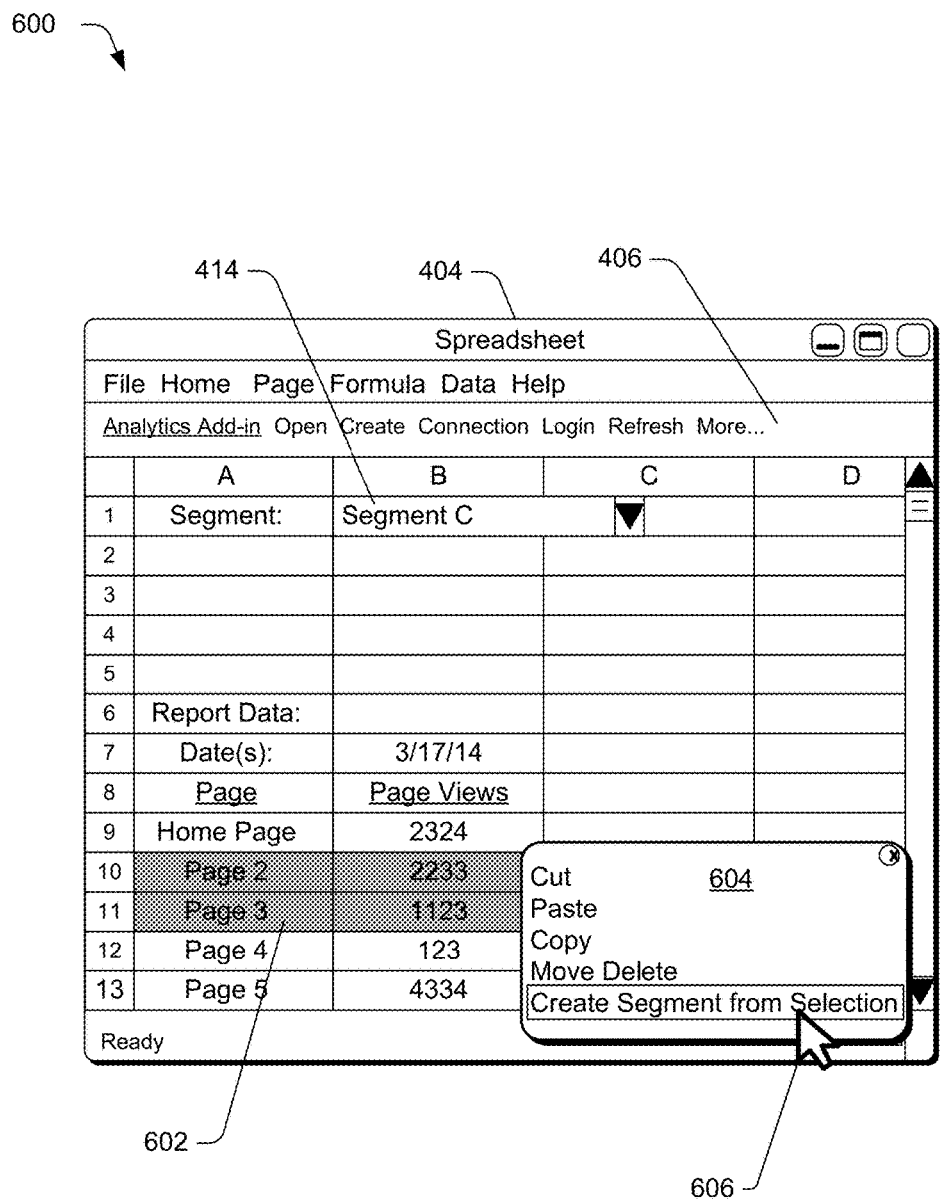
FIG. 6 is a diagram depicting an example user interface scenario for creation of a segment in accordance with one or more implementations.

FIG. 6 depicts generally at 600 an example user interface scenario for creation of a segment in accordance with one or more implementations. Here, the example spreadsheet user interface 404 of FIG. 4 is again depicted. A selection 602 of some of the report data is shown. In this case, the selection 602 corresponds to page views for two particular pages (e.g., page 2 and page 3) of the report data. The data is also associated with a particular date of Mar. 17, 2014. With the target data selected, a user may right click, select a menu option, or otherwise interact to bring up a menu of options for the selected data. In the example in FIG. 6, a right click brings up a dialog 604 having different options for the selection 602 including a create segment option 606. The create segment option 606 is selectable to initiate creation of a new segment that is based upon the selection 602. In particular, selection of the segment option 606 will cause creation of a segment that includes the two particular pages in the manner previously discussed. The new segment may then be used to create another report, look at different metrics for the segment, and so forth. Additionally, upon refreshing the depicted spreadsheet user interface 404, the new segment may be available as an item selectable via the interactive form control 414. Selection of the new segment via the interactive form control 414 will cause the report data to be filtered so as to show just the data for the two particular pages.

Having considered some example details of techniques for analytics segments and controls, consider now an example system and devices that may be employed in one or more implementations of the described techniques.

Example System and Devices

Figure 7:
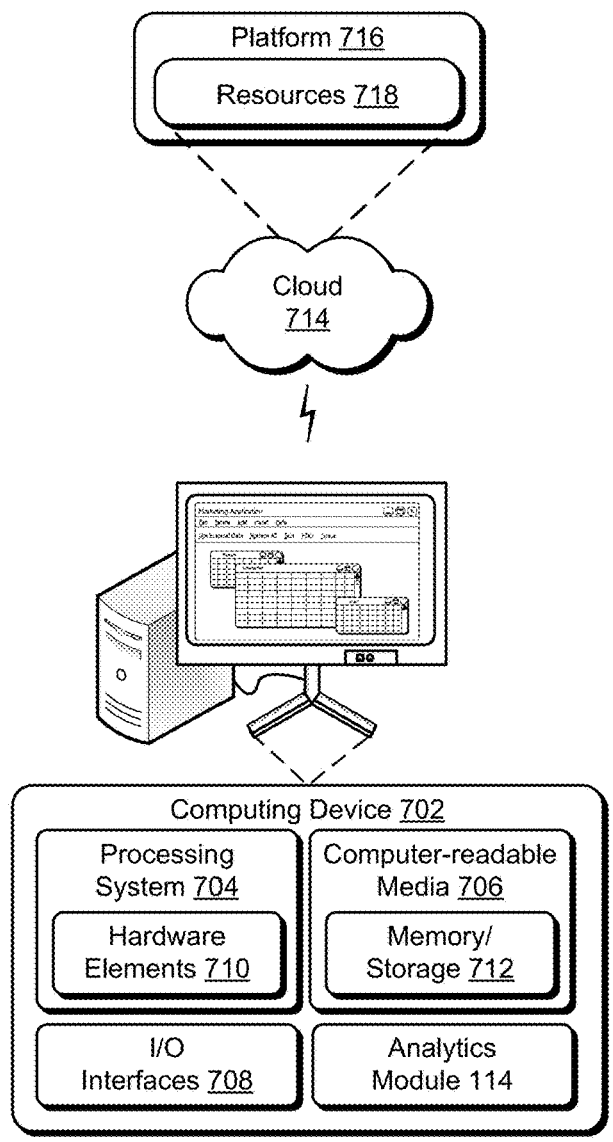
FIG. 7 illustrates an example system, devices, and components that can be employed to implement aspects of the techniques described herein.

FIG. 7 illustrates an example system generally at 700 that includes an example computing device 702 that is representative of one or more computing systems and/or devices that may implement the various techniques described herein. This is illustrated through inclusion of the marketing service 118, which may be configured to provide a suite of digital marketing tools to users of the service. Alternatively, the computing device may represent a client device that includes an analytics module 114 to implement aspects of the described techniques. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device comprising:
adding at least one form control into a document for a host program module via a analytics plug-in for the host program module designed to obtain analytics data for the document through a connection established by the analytics plug-in with a marketing service;
populating via the analytic plug-in, the at least one form control with filter parameters that include existing market segments, each market segment being a combination of segment parameters that describe information about a corresponding market segment, the at least one form control being selectable to cause retrieval of a corresponding sub-set of analytics data from the marketing service for inclusion in the document, wherein said sub-set of analytics data comprises a new and different combination of existing filtered analytics data;
responsive to a selection of filter parameters from the at least one form control, querying the marketing service to obtain the corresponding sub-set of analytics data; and
inserting the corresponding sub-set of analytics data into the document,
wherein the analytics plug-in includes:
analytics component that performs operations from within the host program module to facilitate analytics report creation, establish data connections to the marketing service, execute queries for analytics data and sub-sets of analytics data from the marketing service, and select the filter parameters to constrain the queries to selected segment, metrics, and time periods; and
a bridge component that provides a communication interface between the analytics component and host program module.

2. The method as described in claim 1, wherein the document comprises an analytics report having embedded analytics data obtained from the marketing service via the analytics plug-in.

3. The method as described in claim 1, wherein the host program module comprises a spreadsheet application, the document is a spreadsheet for the spreadsheet application, and the one or more form controls are added into cells of the spreadsheet.

4. The method as described in claim 2, wherein inserting the corresponding sub-set of analytics data comprises returning the analytics data to a designated output range of cells in the spreadsheet.

5. The method as described in claim 1, wherein the analytics data describes interactions of consumers with one or more web resources made available by a service provider.

6. The method as described in claim 5, wherein the filter parameters comprise a collection of marketing segments associated with a data source that contains the analytics data describing the interactions of the consumers with the one or more web resources.

7. The method as described in claim 6, Wherein the one or more form controls are configured to enable changing of the filter parameters from directly within the document to cause the retrieval of corresponding analytics data and sub-sets of analytics data from the data source.

8. The method as described in claim 1, wherein the bridge component exposes a user-defined function linked to the one or more form controls that is called from the host program module when a change in the value of the one or more or controls occurs.

9. The method as described in claim 1, wherein the one or more form controls are provided as built-in functionality of the host program module that is invoked via the analytics plugin.

10. The method as described in claim 1, wherein the filter parameters comprise a collection of time period expressions for filtering of the analytics data according to selected time periods.

11. The method as described in claim 1, wherein the filter parameters comprise a collection of analytics metrics for filtering of the analytics data supported by the marketing service.

12. One or more computer-readable storage media comprising instructions that, when executed by a computing device, implement an analytics module configured to perform operations comprising:
creating an analytics report within a spreadsheet for a spreadsheet application that contains embedded analytics data from a marketing service that describes interactions of consumers with one or more web resources made available by a service provider, the report configured to contain a sub-set of the analytics data;
building one or more form controls associated with cells of the spreadsheet application that enable selection of filter parameters to selectively filter the analytics data presented in the spreadsheet, wherein the filter parameters include existing market segments, each market segment being a combination of segment parameters that describe information about a corresponding market segment; and
populating the form controls with filter parameter values selectable through interaction with the form controls to cause updating of the spreadsheet by automatically querying the marketing service to refresh the spreadsheet with at least one sub-set of analytics data corresponding to selected filter parameter values, wherein said at least one sub-set of analytics data, comprises a new and different combination of existing filtered analytics data,
wherein building the one or more form controls comprises:
providing an interactive dialog having one or more form control creation options associated with the one or more filter parameters operable to initiate the creation of form controls for selected filter parameters and specify cell locations for the form controls: and
adding the form controls for selected filter parameters directly into the specified cell locations.

13. The one or more computer-readable storage media of claim 12, wherein the analytics module is configured as a plug-in for the spreadsheet application.

14. The one or more computer-readable storage media of claim 12, wherein the analytics module is further configured to perform operations comprising:

responsive to a selection of filter parameter values from the form controls, querying the marketing service to obtain the corresponding sub-set of analytics data; and refreshing the analytics data presented in the spreadsheet in accordance with the querying.

15. A method implemented by a computing device comprising:

creating an analytics report within a spreadsheet for a spreadsheet application that is configured to contain embedded analytics data from a marketing service that describes interactions of consumers with one or more web resources made available by a service provider, the report configured to contain a sub-set of the analytics data;

building one or more form controls associated with cells of the spreadsheet application that are configured to enable selection of filter parameters to selectively filter the analytics data presented in the spreadsheet, wherein filter parameters include existing market segments, each market segment being a combination of segment parameters that describe information about a corresponding market segment; and populating the form controls with filter parameter values selectable through interaction with the form controls to cause updating of the spreadsheet by automatically querying the marketing service to refresh the spreadsheet with at least one sub-set of analytics data corresponding to selected filter parameter values, wherein said at least one sub-set of analytics data comprises a new and different combination of existing filtered analytics data, wherein building the one or more form controls comprises:

providing an interactive dialog having one or more form control creation options associated with the one or more filter parameters operable to initiate the creation of form controls for selected filter parameters and specify cell locations for the form controls; and adding the form controls for selected filter parameters directly into the specified cell locations.

16. The method as described in claim 15, wherein said creating, building and populating are performed by an analytics module configured as a plug-in for the spreadsheet application.

17. The method as described in claim 15, wherein said creating, building and populating are performed by an analytics module configured as a plug-in for the spreadsheet application, and wherein the analytics module is further configured to perform operations comprising:

responsive to a selection of filter parameter values from the form controls, querying the marketing service to obtain the corresponding sub-set of analytics data; and refreshing the analytics data presented in the spreadsheet in accordance with the querying.

\* \* \* \* \*

UNITED STATES PATENT AND TRADEMARK OFFICE
CERTIFICATE OF CORRECTION

PATENT NO. : 10,152,469 B2
APPLICATION NO. : 14/247733
DATED : December 11, 2018
INVENTOR(S) : Guillaume L. Escarguel et al.

Page 1 of 1

It is certified that error appears in the above-identified patent and that said Letters Patent is hereby corrected as shown below:

In the Claims

Column 15, Line 40, before "analytics component that performs operations from within the host program module to facilitate analytics report creation,...", insert -- an --, therefor.

Column 15, Line 47, delete "segment", insert -- segments --, therefor.

Column 16, Line 15, delete "more or", insert -- more form --, therefor.

Column 16, Line 53, delete "data,", insert -- data --, therefor.

Column 16, Line 62, delete "controls:", insert -- controls; --, therefor.

Signed and Sealed this
Sixteenth Day of April, 2019

Andrei Iancu
*Director of the United States Patent and Trademark Office*